United States Patent
Frey, Jr. et al.

(10) Patent No.: US 11,168,959 B2
(45) Date of Patent: Nov. 9, 2021

(54) WING MOUNTED SEEKER

(71) Applicant: BAE Systems Information and Electronic Systems Integration Inc., Nashua, NH (US)

(72) Inventors: Robert D Frey, Jr., Bolton, MA (US); Maxwell L Affleck, New Boston, NH (US); Jason H Batchelder, Lyndeborough, NH (US); Joseph P Cullen, Chelmsford, MA (US); Matthew H Robichaud, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 273 days.

(21) Appl. No.: 16/527,112

(22) Filed: Jul. 31, 2019

(65) Prior Publication Data
US 2021/0033371 A1    Feb. 4, 2021

(51) Int. Cl.
*F41G 7/22* (2006.01)
*G01J 11/00* (2006.01)

(52) U.S. Cl.
CPC ............ *F41G 7/2246* (2013.01); *G01J 11/00* (2013.01); *F41G 7/226* (2013.01)

(58) Field of Classification Search
CPC ............................... F41G 7/2246; G01J 11/00
See application file for complete search history.

(56) References Cited

U.S. PATENT DOCUMENTS

| | | | |
|---|---|---|---|
| 6,969,025 B1 | 11/2005 | Bugge et al. | |
| 10,345,087 B2* | 7/2019 | Choiniere | F42B 15/10 |
| 2007/0205320 A1* | 9/2007 | Zemany | F42B 10/64 |
| | | | 244/3.16 |
| 2008/0199143 A1* | 8/2008 | Turner | G02B 19/0033 |
| | | | 385/146 |
| 2012/0002049 A1* | 1/2012 | Fry | F41G 7/2253 |
| | | | 348/148 |
| 2014/0312160 A1* | 10/2014 | Blake | F41G 7/00 |
| | | | 244/3.1 |

(Continued)

OTHER PUBLICATIONS

International Search Report, PCT/US20/41920, dated Apr. 23, 2021, 7 pages.

*Primary Examiner* — Marcus E Windrich
(74) *Attorney, Agent, or Firm* — Sand, Sebolt & Wernow LPA; Scott J. Asmus

(57) ABSTRACT

An optical seeker assembly having an optical detector located within the wing or canards of a precision guided munition. The optical seeker provides on-wing processing that generates low bandwidth detection data that can be easily transferred to a primary CPU located within the main body or fuselage of the precision guided munition. The on-wing processing reduces or eliminates the need for optical fibers extending between an optical wedge and an optical detector to reduce the likelihood of optical fibers from impeding in the mechanical deployment of the wing and reduces losses. The reduction or elimination of optical fibers between the optical wedge and the optical detector further enables the optical detection assembly to have a higher pixel ratio or transmitting raw data between the wedge and the detector by sending sampled detection data across a low bandwidth link to a CPU in the main body.

11 Claims, 8 Drawing Sheets

(56) References Cited

U.S. PATENT DOCUMENTS

| | | | |
|---|---|---|---|
| 2016/0084623 A1* | 3/2016 | Facciano | H01Q 1/28 |
| | | | 244/3.24 |
| 2017/0227330 A1* | 8/2017 | Tomich | F41G 7/2293 |
| 2019/0041178 A1* | 2/2019 | Choiniere | F42B 15/10 |
| 2020/0057456 A1* | 2/2020 | Araki | G05D 1/12 |
| 2020/0080819 A1* | 3/2020 | Vasile | F41G 7/2226 |
| 2020/0263958 A1* | 8/2020 | Levy | H04N 5/2253 |
| 2021/0033371 A1 | 2/2021 | Frey et al. | |
| 2021/0140748 A1* | 5/2021 | Buttolph | F42B 10/14 |
| 2021/0172717 A1* | 6/2021 | Schorr | F42B 10/46 |
| 2021/0278516 A1* | 9/2021 | Choiniere | F41G 9/00 |

* cited by examiner

WING MOUNTED SEEKER

TECHNICAL FIELD

The present disclosure relates generally to an implementation of a wing mounted seeker used in a moveable platform. More particularly, the present disclosure provides a wing mounted seeker having detection processing logic located within the wing. Specifically, the detection processing logic located in the wing enables a low bandwidth link, such as a electrical harness having power, control and communications (in addition to a wire), to not impede the wing during movement from a collapsed position to a deployed position.

BACKGROUND

Seekers are typically used in various projectiles to provide guidance, navigation and control of an asset such as a precision guided munition and other projectiles. There are numerous variations with respect to the precision guided munitions category. The seeker typically has sensors such as imaging, infrared and/or radar that allows the projectile to identify a target with precision. In most cases the seeker is designed to improve navigation and target location which includes operating in hostile environments that may include GPS-denied environments. The seeker is typically mounted in the nose or front portion of the projectile.

The seeker can also be mounted on the wing of the projectile, which introduces certain technical challenges. One example of a wing mounted seeker is the APKWS® precision guide munition which is a design conversion of Hydra 70 unguided rockets with a laser guidance kit to turn them into precision-guided munitions. The modified rockets that employ the laser guidance kit are lower in cost and are lighter as compared to the current inventory of laser-guided weapons. These precision guided projectiles also have a lower yield more suitable for avoiding collateral damage, and takes one quarter of the time for ordnance personnel to load and unload.

Some APKWS systems use a Distributed Aperture Semi-Active Laser Seeker (DASALS) technology. This system allows a laser seeker to be located in the leading edge of each of the forward control canards or wings, working in unison as if they were a single seeker. This configuration allows existing warheads to be used without the need for a laser seeker in the projectile nose.

An exemplary APKWS system in one example is composed of the launch platform, with rockets equipped with the mid-body guidance unit, the lengthened tube rocket launcher, the aiming cue (not needed for attack helicopters), and storage kits for rockets and guidance kits, respectively, to ensure they are safe in the field. The mid-body guidance unit is equipped with DASALS seeker optics which in one example deploys about 0.5 seconds after launch and is attached in between the rocket motor and a warhead and fuze. The precision guidance kit in one example increases length and weight. As an example of operation, for firing ranges around 1,00-5,000 meters can hit a target in less than 5 seconds after firing. Maximum range depends upon the motor, but the seeker can see many miles and a more powerful motor could extend range while retaining accuracy.

SUMMARY

Issues continue to exist with mounting seeker optics and optical detectors in a wing or canard of a moving platform, such as a rocket. Mounting the optical detector within a wing or canard is challenging because of the electronic circuitry required to process the information from the optics. One exemplary challenge is the environment within which the optical detector is located. Particularly, when the platform is implemented as a high speed or ultrasonic missile/rocket, the wings/canards of the missile are subjected to high temperature variations due to high speeds. State of the art seekers, located in the wings of a missile, utilize an optic that focuses towards an optical fiber that is then run to an optical detector located within the main body or fuselage of the missile. The fiber optic bundle, connected with the optical outlet of the optic, can lose signal strength due to optical transmission losses in the fiber and at the interface between the optical outlet and the fiber optic bundle inlet. The reduction in signal impacts the signal to noise of the system, reducing acquisition range and increasing angle measurement noise which impacts guidance performance.

Thus, a need continues to exist for an improved optical detection system for a seeker located on a wing of a platform, such as a rocket/missile or other precision guided asset. The present disclosure addresses these and other issues by providing an optical seeker assembly, having increased sensitivity by eliminating the fiber optic bundle between the optics and the optical detector. The optical seeker assembly of the present disclosure further increases pixel density over previous embodiments that are typically 3 pixels per system axis. In one example a 16-pixels-per-optic per wing/canard for a total of 32 pixels per system sensing axis is described. The increased number of pixels would increase the size of a fiber optic bundle, which would add size and weight constraints to the construction of a conventional optical seeker assembly. Thus, the optical seeker assembly of the present disclosure enables a system to increase pixel density and decrease losses by moving the optical detector into the wing of the platform or missile. Other pixel arrays are considered depending upon the application. For smaller size form factors, an 8-pixel array can be implemented, whereas certain applications may desire larger pixel arrays.

The detector interfaces with transimpedance amplifiers, a high speed analog to digital converter and a processor that performance pulse detection so that the signal generated by the optical detector in response to a detected optical signal that may be transmitted along a low speed serial interface via wire link from the optical detector on the wing/canard into a main central processing unit or computer located within the main body of the platform or missile. Thus, the detected pulse amplitudes from the pixel array sent to the main CPU where the main CPU may process the data from one wing and coordinate signals from other respective optical seeker assemblies on other wings to locate and guide the platform or missile to its intended target location.

One problem that continues to exist with fiber bundles is that the optics mounted on the wing/canard is mechanically deployed about a pivot axis when the missile or platform is fired. The mechanical configurations of the deployment of the wings/canards that pivot outwardly require the fiber optic bundle be small so as to not interfere with the pivot action of the wings during their deployment. In order to increase the pixel size of the optics, the fiber optic bundle would need to increase in size, as well. The increased size in the fiber optic bundle caused difficulties around the mechanical pivoting deployment of the wings that carry the optics. Thus, the present disclosure provides an optical seeker assembly that satisfies the need for increasing pixel density without interrupting the mechanical deployment of the pivoting wings by moving the optical detector assembly onto the wing and transmitting the optical detector signals along a low bandwidth transmission line whose size is independent from pixel density, that will not interfere with the mechanical pivoting deployment of the wings after the missile has been fired. The electronics that support the optical detector have an amplifier for the optical detector but also include the digitization, as well as the pulse discrimination. Thus, the only signal output from the optical detector moving along the low bandwidth link, such as electrical wiring harness, from the optical seeker assembly of the present disclosure through the mechanical pivot connection of the wing to the main body or fuselage of the platform or missile is a low bandwidth pulse detection data or signal. Thus, the low bandwidth pulse detection data or signal may be transmitted through a very small wire harness, which does not interfere with the mechanical deployment of the wings/canards about a pivot axis relative to the fuselage or body of the missile. The low bandwidth pulse data or signal may then be analyzed in the main CPU to detect the laser return signal to guide the missile or projectile towards its intended target location.

In one aspect, an exemplary embodiment of the present disclosure may provide an optical seeker assembly mounted within a wing that moves between a retracted first position and a deployed second position, the optical seeker assembly comprising: an optical waveguide configured to transmit an optical signal therethrough; an optical detector connected directly to the optical waveguide to detect the optical signal transmitted through the optical waveguide; and wherein the optical waveguide and the optical detector move in unison with the wing as the wing moves from the first position and the second position. This exemplary embodiment or another exemplary embodiment may further provide a longitudinal axis of the optical waveguide; a circuit card mounted within the wing in electrical communication with the optical detector, and the circuit card has first and second major surfaces, and neither major surface intersects the longitudinal axis of the optical waveguide within the wing. This exemplary embodiment or another exemplary embodiment may further provide a first end of the optical waveguide sized complementary to an aperture formed in a leading edge of the wing; and a second end of the optical waveguide disposed forwardly from a trailing edge of the wing, wherein the optical detector is connected to the second end of the optical waveguide and the optical detector is positioned forwardly from the trailing edge within the wing. This exemplary embodiment or another exemplary embodiment may further provide a circuit card in electrical communication with the optical detector for processing pulses detected by the optical detector, and the circuit card having a rear edge disposed forwardly from the trailing edge within the wing. This exemplary embodiment or another exemplary embodiment may further provide a low-bandwidth link between the wing and a body of platform to which the wing is moveably connected; and an optical converter mounted within the wing electrically coupled to the circuit card for converting the processed pulsed into low-bandwidth signals for transmission along the low bandwidth link from the wing to a main processor within the body of the platform. This exemplary embodiment or another exemplary embodiment may further provide wherein the optical seeker assembly is free of any fiber optic cables that extend from the wing into a main body to which the wing is moveably connected. This exemplary embodiment or another exemplary embodiment may further provide wherein the optical converter is a field programmable gate array (FPGA) within the wing that down samples processed pulse data from the circuit card into the low-bandwidth signal for transmission along the low bandwidth link in the form of a low-bandwidth wire harness that does not inhibit the movement of the wing between the first and second positions. This exemplary embodiment or another exemplary embodiment may further provide wherein the circuit card within the wing includes: a transimpedance amplifier; a high pass filter electrically downstream from the transimpedance amplifier; a variable gain amplifier electrically downstream from the high pass filter; and an analog-to-digital converter electrically downstream from the variable gain amplifier. This exemplary embodiment or another exemplary embodiment may further provide a flexible circuit coupling an output of the optical detector to an input of the transimpedance amplifier, wherein the flexible circuit is disposed entirely within the wing. This exemplary embodiment or another exemplary embodiment may further provide wherein the circuit card includes: a first major surface and an opposite second major surface, wherein the first major surface does not intersect a longitudinal axis of the optical waveguide within the wing. This exemplary embodiment or another exemplary embodiment may further provide wherein the first major surface is offset parallel to the longitudinal axis of the optical waveguide. This exemplary embodiment or another exemplary embodiment may further provide wherein the optical seeker assembly is free of any fiber optic cables between the optical waveguide and the optical detector.

In another aspect, an exemplary embodiment of the present disclosure may provide a method comprising: deploying a wing connected to a body from a first position to a deployed second position and detecting a signal with an optical seeker assembly carried by the wing; processing the signal within the wing to generate a low bandwidth data stream; transmitting the low bandwidth data stream along a low bandwidth link from the wing in the deployed second position to the body; and guiding the body towards a target based on data contained in the low bandwidth data stream. This exemplary embodiment or another exemplary embodiment may further provide detecting the signal with an optical detector disposed within the wing and the optical detector coupled with an optical wedge having a longitudinal axis. This exemplary embodiment or another exemplary embodiment may further provide transmitting the signal from the optical detector to a circuit card assembly disposed within the wing via a flexible circuit, wherein the circuit card assembly does not intersect the longitudinal axis within the wing. This exemplary embodiment or another exemplary embodiment may further provide wherein signal is a laser pulse returning from a target, further comprising: receiving the returning laser pulse through an optical wedge; detecting the returning laser pulse via an optical detector coupled to the optical wedge within the wing, wherein no fiber optic cables are present between the optical detector and the optical wedge; generating detection data in the optical detector based on the returning laser pulse; and transmitting the detection data along a flexible circuit from the optical detector to a circuit card assembly. This exemplary embodiment or another exemplary embodiment may further provide amplifying, via a transimpedance amplifier, the detection data; filtering the detection data after having been amplified in the transimpedance amplifier; after filtering, amplifying the filtered detection data in a variable gain amplifier; sampling in an analog-to-digital converter the filtered and amplified detection data after being amplified by the variable gain amplifier to generate sampled data within the wing. This exemplary embodiment or another exemplary embodiment may further provide converting, via an optical converter located within the wing, the sampled data into the detection data that is less than about 50 Hz. This exemplary embodiment or another exemplary embodiment may further provide wherein the wing is a canard on a missile, and deploying the canard from the first position to the deployed second position is accomplished by pivoting the canard about a pivot connection between the canard and the body; and rotationally moving the optical seeker assembly including an optical detector, a circuit card assembly, and an optical converter in unison with the canard. This exemplary embodiment or another exemplary embodiment may further provide transmitting the low bandwidth data stream from the wing to the body without the use of a fiber optic cable; and aligning a circuit card assembly within the wing with a longitudinal axis of the optical seeker assembly, wherein the circuit card assembly does not intersect the longitudinal axis within the wing.

In yet another aspect, an exemplary embodiment of the present disclosure may provide an optical seeker assembly having an optical detector located within the wing or canards of a platform. The optical seeker provides on-wing processing that generates low bandwidth detection data that can be easily transferred to a primary CPU located within the main body or fuselage of the platform. The on-wing processing enables the present disclosure to eliminate the need for optical fibers extending between an optical wedge and an optical detector to reduce the likelihood of optical fibers from impeding in the mechanical deployment of the wing or canard from a collapsed first position to a deployed second position. The elimination of optical fibers between the optical wedge and the optical detector enables the optical detection assembly to have a higher pixel ratio without the need for increase size, weight, and power for transmitting raw data between the wedge and the detector since the detection data is sampled down, via on-wing processing, and sent across a low-bandwidth link from the wing or canard to a CPU in the main body.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1A:
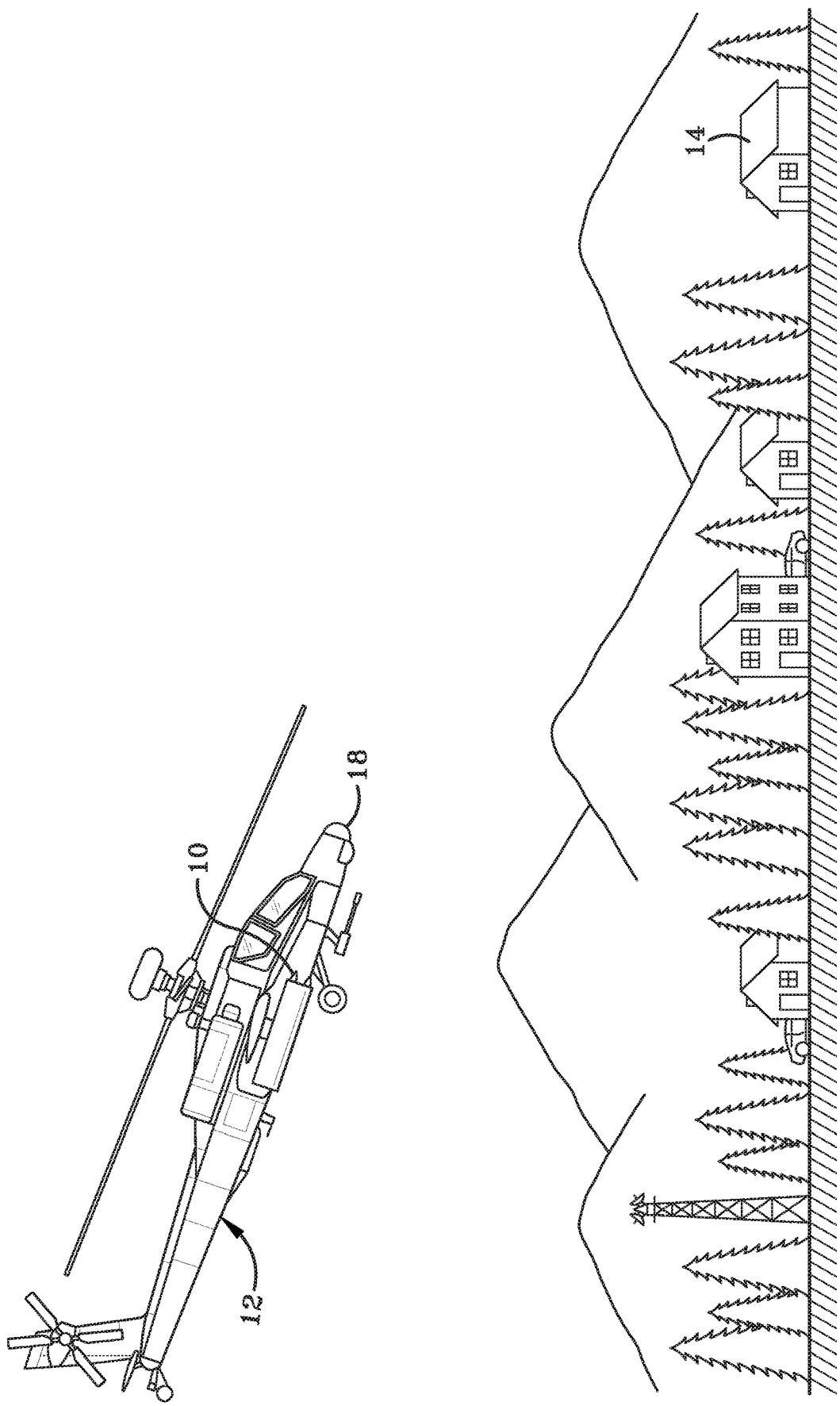
FIG. 1A is a diagrammatic view of a precision guided munition system, carried by another platform, such as a helicopter.
Figure 1B:
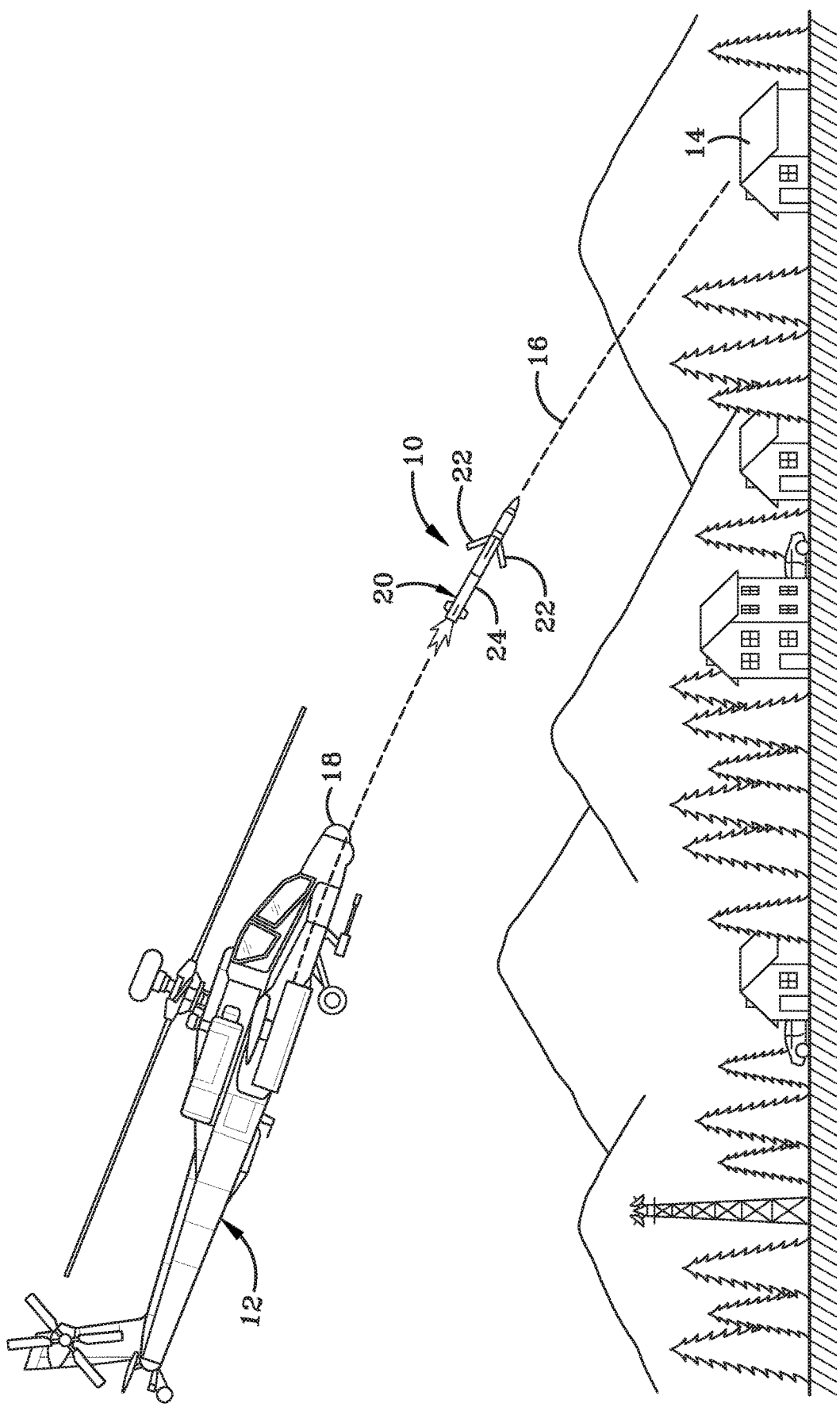
FIG. 1B is a diagrammatic view of the precision guided munition having been launched, shot, or otherwise deployed, by the platform towards an intended target.

FIG. 1A and FIG. 1B depict an environment in which a first platform for a precision guided munition is shown generally at 10. The precision guided munition 10 is carried by a second platform 12, which may also be referred to as aerial vehicle 12 such as a helicopter, airplane or drone. When platform 12 is embodied as an aerial vehicle, it may be either manned or unmanned. Alternatively, aerial vehicle 12 may be a jet aircraft. Platform 12 is configured to launch or fire the precision guided munition 10 towards an intended target 14 along a trajectory 16. The platform 12 in one embodiment has a laser designator system 18. In another embodiment a laser designator system can be ground based or on a different aerial vehicle.

The precision guided munition in one example may be an APKWS® precision guided rocket having a Distributed Aperture Semi-Active Laser Seeker (DASALS) technology (or alternatively Distributed Array summation technology) and a thrust system located near the tail of the platform.

Figure 2:
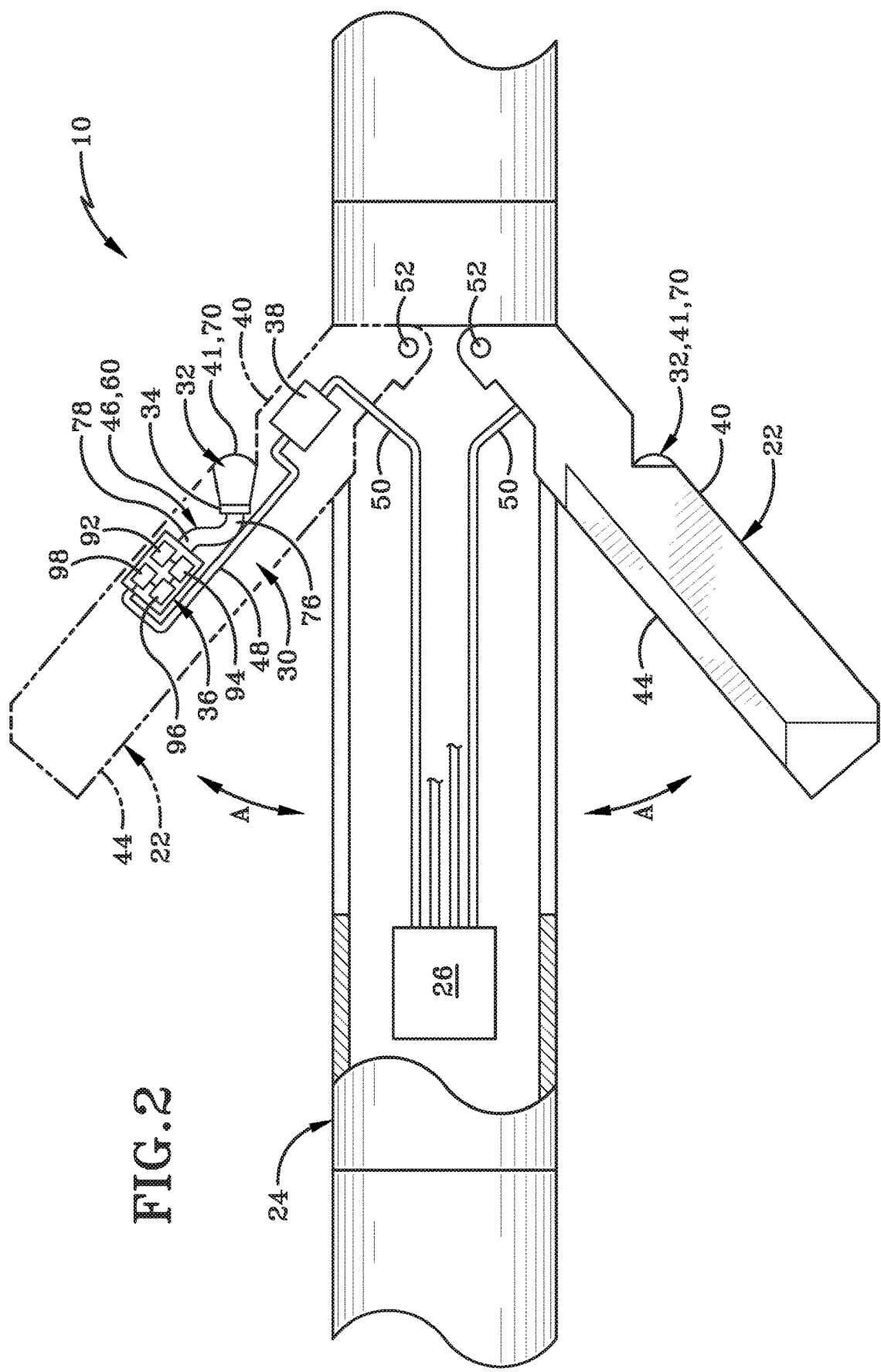
FIG. 2 is a diagrammatic top view of the precision guided munition with its wings or canards shown in the deployed position and the deployed wings carrying the optical detection components for a seeker.

As described in greater detail herein, precision guided munition 10 further includes at least one canard or wing 22 mechanically connected to the main body or fuselage 24 of the precision guided munition 10. Within the main body or fuselage 24, the precision guided munition 10 may house munitions or other explosive materials, which are configured to detonate on impact or near impact at the intended target 14. As one having ordinary skill in the art understands, the laser system 18 in one example is configured to guide the precision guided munition 10 towards the intended target 14. At least one wing 22, which may be one of four wings connected to the body 24, is configured to deploy from a collapsed first position to a deployed second position as indicated by Arrow A (FIG. 2). In one particular embodiment, at least one wing 22 moves about a pivot axis or pivot 52 (FIG. 2) between the retracted first position and the deployed second position.

FIG. 2 depicts that the wing 22 carries an optical seeker assembly in accordance with the present disclosure. The optical seeker assembly is shown generally at 30. As will be described in greater detail below, the optical seeker assembly 30 of the present disclosure is an improvement over conventional optical seekers within conventional precision guided munition systems inasmuch as assembly 30 includes the optical detector being placed within the canard or wing 22 rather than being placed within the body or fuselage 24. By placing the optical detector within the wing 22, the precision guided munition 10 is able to eliminate the need for a fiber optic bundle of fiber optic cables, which simplifies the mechanical deployment or movement of the wings 22 between the first position and the second position about pivot 52. The optical seeker assembly 30 in this example cooperates with the laser system 18 to guide the platform 10 towards the intended target 14. More particularly, the laser system 18 generates a laser and a pulsed response is observed by the optical seeker assembly and detected and sent to a main central computer processing unit (CPU 26 located within the main body 24 of the platform 10).

FIG. 2 depicts that the optical seeker assembly 30 within wing 22 includes an optical waveguide or optical wedge 32, an optical detector 34, a circuit card assembly 36, and a pulse discriminator 38. Optical waveguide or wedge 32 is oriented such that its inlet or opening is aligned with a leading edge 40 of the wing 22. Wing 22 has a trailing edge that is opposite the leading edge 40 relative to the intended direction of travel of precision guided munition 10. The optical detector 34 is mounted or optically connected directly to a second end 42 (FIG. 3) of the optical wedge or waveguide 32. The direct connection of the optical detector 34 to the optical waveguide 32 ensures that there is no air gap between the detector and the optical system ensuring optimum index of refraction matching to the detector and no loss of rays in the interface to the detector. The optical detector 34 is wholly enclosed within the wing 22 between the leading edge 40 and the trailing edge 44. Optical detector 34 is electrically coupled with the circuit card assembly 36 via a link 46. The circuit card assembly 36 is electrically connected with the pulse discriminator 38 via link 48. Pulse discriminator 38 is connected with the main CPU 26 located within the main fuselage or body 24 of the precision guided munition 10 via a low bandwidth link 50 that does not interrupt or impede pivoting movement of the wing 22 as indicated by Arrow A about the pivot axis 52. Stated otherwise, when the wing 22 pivots (as indicated by Arrow A) about the pivot axis 52 relative to the body 24 of the precision guided munition 10, the wing 22 carries the entire optical assembly 30, including the optical wedge or waveguide 32, the optical detector 34, the circuit card assembly 36 and the pulse discriminator 38. The low bandwidth link or transmission line or wire, generally shown as 50, does not interfere with pivoting movement and is easily able to be mechanically fed between the wing 22 and the body 24 of the precision guided munition 10. The low bandwidth link 50 is easier to bend, insulate, and otherwise fabricate and manufacture compared to traditional fiber optic bundles that extend between an optical wedge and an optical detector located within the main body of a conventional precision guided munition.

FIG. 2 further depicts portions of the circuit card assembly 36 connected with other elements of the optical seeker assembly 30. Notably, circuit card assembly 36 in this example includes a transimpedance amplifier 92, a high pass filter 94, a variable gain amplifier 96, and an analog to digital (ADC) converter 98 and the pulse detection processor 38, which may be located on the circuit card assembly 98 or may be located off the circuit card assembly but still within the wing 20. The transimpedance amplifier 92 is electrically connected with the second end 78 of the flexible circuit 60. The transimpedance amplifier is electrically connected upstream from the high pass filter 94. The high pass filter is electrically connected with the variable gain amplifier and is electrically between the transimpedance amplifier and the variable gain amplifier 96. Variable gain amplifier 96 is electrically connected upstream from the analog to digital converter, which has an output connected with link 48 for electrical connection with the pulse discriminator 38, which may be a FPGA. The FPGA, or pulse discriminator 38, is output along the low bandwidth length around or adjacent the pivot axis 52 of the wing 22 relative to the main body 24 of the precision guided munition 10 such that the output of the FPGA or pulse discriminator 38 may be sent along the low bandwidth link 50 to the main CPU 26.

Figure 3:
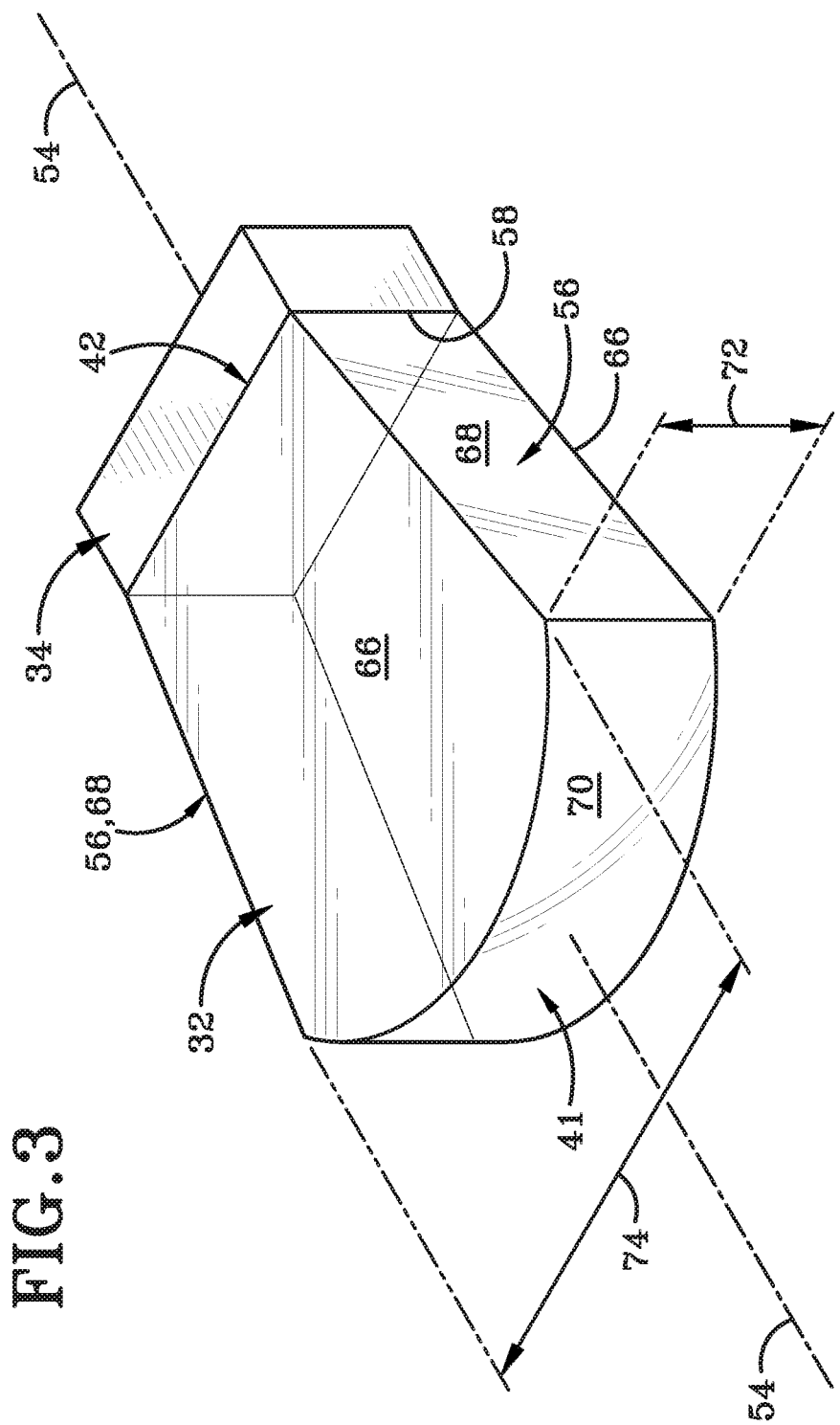
FIG. 3 is a perspective view of a portion of the optical seeker.

FIG. 3 depicts the optical wedge or optical waveguide 32 as having a convex first end 41 opposite a second end 42 and centered along a longitudinal axis 54. Longitudinal axis 54 of the wedge 32 is associated with the direction within which return signals enter the first end 41 of the wedge 32 and are directed via tapered sidewalls 56 towards the second end 42 to the optical detector 34. The optic or optical waveguide 32 is convex in one axis providing resolved angle information in this axis. The optic is flat in the other axis collecting light from all angles. The light bounces down the wedge 32 and enters the detector (not shown). Sidewalls defining surface 66 may be coated with an optical coating to ensure total internal reflection (TIR) is achieved by the signal entering first end 41 of the wedge 32 and moving towards the second end 42 to be detected by the optical detector 34. TIR infers an optic to air interface. In a further embodiment, the application of wax for thermal stability mitigates this possibility, though there may be applications where the wax is unnecessary. Due to the presence of the wax, the surface 66 has a reflective coating. The sidewall 56 has an absorptive coating or surface treatment. The light in the resolved axis does not impinge on surface of sidewall 56. The light in the unresolved axis bounces down the wedge off of the surfaces 66. The major surface 66 of wedge 32 is defined oriented in the lengthwise direction by the frontal surface 70 having an area that is approximately defined in one example by 2×10 millimeters. Stated otherwise, the frontal surface 70 may have a height dimension 72 and a length dimension 74. The size of the aperture drives range and angle noise performance. Also, increasing the aperture in the unresolved axis (2 mm in one example) causes the angle of incidence at the detector to become higher impacting potential increasing transmission losses. The length dimension 74 in one example is five times greater than the height dimension 72; thus, in this example, when the frontal surface 70 has a height 72 of two units, then the length 74 is ten units. However, in some instances, the ratio of these width to height dimensions is not critical. The narrow dimension is driven both by angle of incidence concerns and aerodynamic considerations. Narrow dimensions have lower drag. There may be an advantage of this concept over the certain conventional systems in that the narrowness of this aperture and the resultant impact on drag. In addition, this system of the present disclosure allows the aperture to be closer to the body allowing for aerodynamic improvement in the wing design. The conventional wing mounted seeker system has to be mounted further out on the wing in order to eliminate shadow issues (body blocking field of view). The major surface 66 of the wedge 32 may be defined by the length of the wedge between its forward end 41 and its rear end 42 and the width 74 of the wedge 32. The minor surface 68 may be defined by the height 72 and the length of the optical wedge 32 measured between the forward first end 41 and the second end 42.

The front of the optical wedge 32 may be a convexly curved surface that may also be described as an aspherical element. In one particular embodiment, the optic may be a single molded optic from a polymer material that forms the general wedge shape and the convex surface without any breaks or interface therebetween. As such, the optical wedge 32 may be considered a unibody or monolithic member in one example. In other embodiments, the seeker optics or optical waveguide requires a narrow band filter, such as a passband filter, within the optical path. One embodiment would separate the optic into three elements, the convex surface is a lens that is glued/bonded to the optical wedge with a filter element sandwiched in between.

Optical detector 34 includes a forward or first end 58 that is directly connected with the second end 42 of the wedge 32. The optical detector 34, which according one embodiment may be either a pin or an APD array, will be bonded to the waveguide 32, which is used to concentrate the photons received at the aperture down to the optical detector or array. Alternatively, the waveguide 32 could interface to a detector housed in a hermetic package with a window, but it may be easier to manufacture a system utilizing a direct bond to a either a backside or frontside illuminated array optical detector 34. This would ensure that substantially all of the light gathered by the waveguide 32 is provided to the optical detector 34 such that there is no air gap between the optical detector 34 and the second end 42 of the waveguide 32. Optical detector 34 has a rear end that is positioned forwardly from the trailing edge within the canard or wing 22.

The optical detector 34 may be epoxied directly to the end of the optical wedge 32 such that there is no air gap between the optical detector and the end of the optical wedge. The epoxy may not be mechanically sufficient to hold the detector to the optical wedge so a second potting material may pot the optical detector to the optical wedge. The potting material eliminates the total internal reflection assumption on the reflectivity of the sides of the wedge. In this case the sides of the wedge of surface 66 will require a reflective coating.

The optical detector 34 may be either backside illuminated or front-side illuminated. The backside illuminated configuration may offer some advantages in packaging. This is because a front-side illuminated optical detector 34 typically requires wire bonds to the pads on the face of the optical detector. Packaging the optical detector in a mount with a window serves to protect these bonds from physical stress. It would be difficult to bond such a detector directly to the optical system. A backside illuminated detector uses a flip-chip configuration with solder balls for direct attachment to the circuit card assembly 36 or a circuit interface implemented on a metalized ceramic substrate. However, a front side illuminated detector offers advantages in sensitivity.

Figure 4:
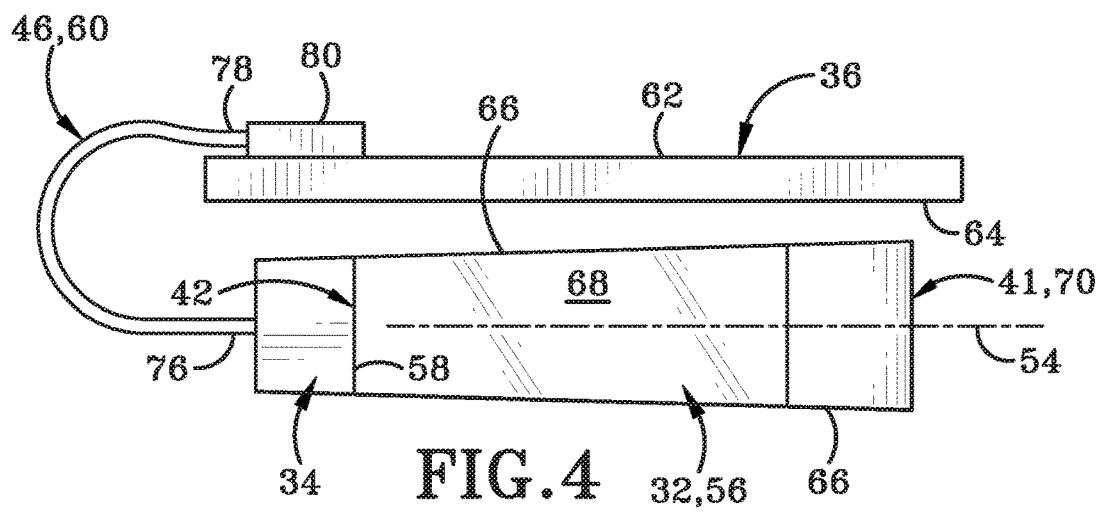
FIG. 4 is a side elevation view of the optical seeker and an optical detection circuit board that would be mounted within a wing or canard.
Figure 5:
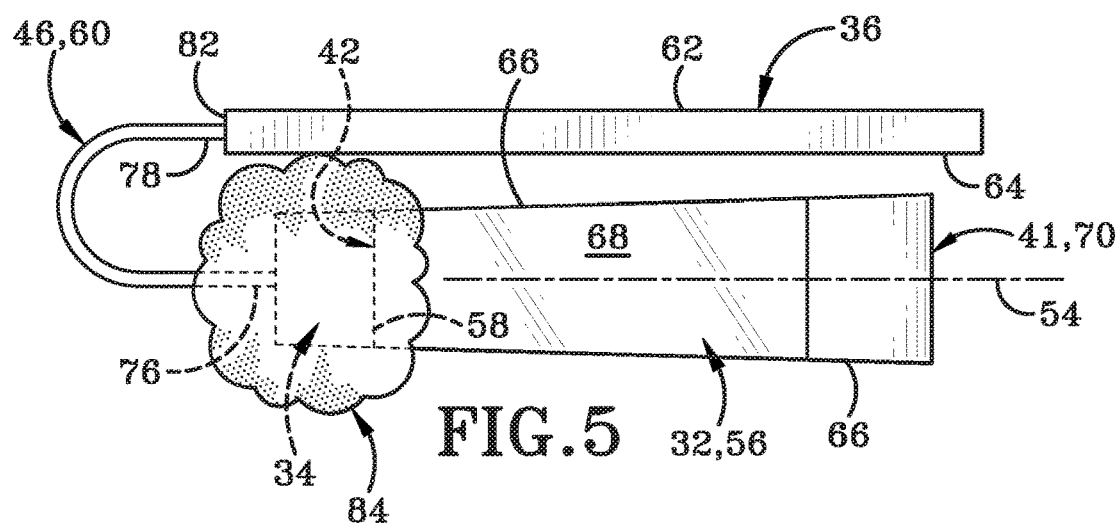
FIG. 5 is a side elevation view of the optical seeker and the optical detection circuit board that would be mounted within a wing or canard and further having potting surrounding the connection of the optical detector to the optical seeker.

FIG. 4 and FIG. 5 depict an exemplary embodiment of the optical wedge 32, the optical detector 34, and the circuit card assembly 36 being connected by a flexible circuit 60. The flexible circuit 60 enables the circuit card assembly 36 to be oriented in a manner such that a first major surface 62 and an opposite second major surface 64 are offset and do not intersect the longitudinal axis 54 of the wedge 32 within the wing 22. In some implementations, the major surfaces 62, 64 of the circuit card assembly 36 may be offset parallel to the longitudinal axis 54 of the wedge 32. However, in other instances, major surfaces 62, 64 may not be exactly parallel to longitudinal axis 54 but they still do not intersect the longitudinal axis 54 within the wing 22. Additionally, while FIG. 4 and FIG. 5 depict the circuit card assembly 36 as being offset to one side of the major surface 66 of the optical wedge 32, it is entirely possible for the circuit card assembly 36 to be offset from a minor surface 68 of the optical wedge.

Flexible circuit 60 includes a first end 76 and a second end 78. First end 76 of the flexible circuit 60 is electrically connected to the optical detector 34. Second end 78 of the flexible circuit 60 is electrically connected to the circuit card assembly 36. In one particular embodiment, second end 78 is electrically connected to a receiving pin pad 80 on the circuit card assembly 36. Pin pad assembly 80 may be located on one of the major surfaces, such as major surface 62 or major surface 64 of the circuit card assembly 36. Alternatively, flexible circuit 60 may be directly connected to a minor surface 82, as shown in FIG. 5.

FIG. 4 and FIG. 5 depict that the circuit card assembly 36 will interface to the optical detector 34 through the flexible circuit 60 allowing the detector 34 to sense light in the same plane as the circuit card assembly 36 rather than the typical plane normal to the circuit card. The optical detector 34 may be bonded using an optical epoxy or similar bonding agent to bond the optical detector 34 to second end 42 of the optical wedge 32. The optical detector 34, the optical epoxy or bonding agent and the flexible circuit 60 are protected by potting the assembly as indicated generally at 84.

Figure 6:
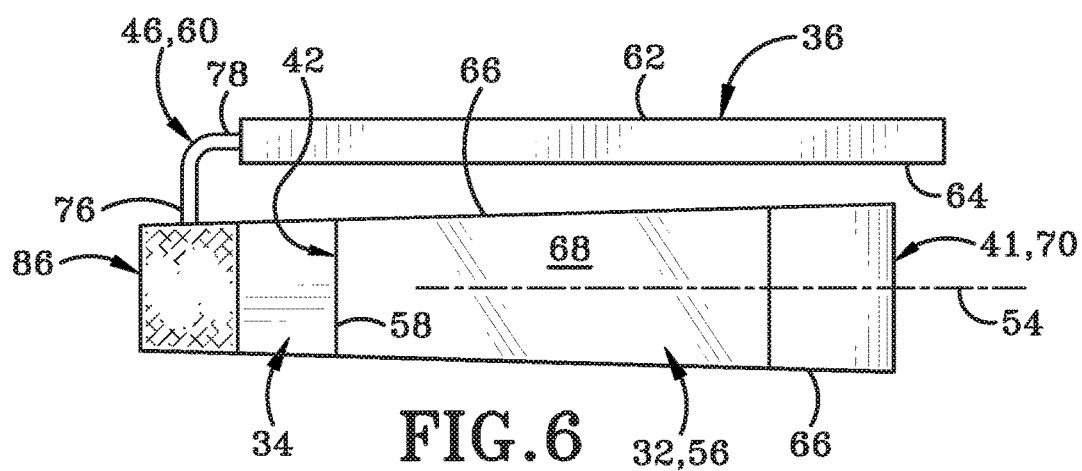
FIG. 6 is a side elevation view of the optical seeker and the optical detection circuit board that would be mounted within a wing or canard and further having a ceramic element coupling the optical detector to the circuit card.

FIG. 6 depicts an alternative configuration where a ceramic substrate 86 is used to provide an interface between the optical detector 34 and the circuit card assembly 36 via the flexible circuit 60. In this instance, the first end 76 of the flexible circuit 60 is connected to the ceramic substrate 86. The ceramic material 86 has a coefficient of thermal expansion (CTE) that matches or closely approximates many detector materials on the optical detector 34. Additionally, when using the ceramic substrate, it may be possible to eliminate the flexible circuit. According to this particular embodiment, the optical detector 34 may be bonded to a ceramic substrate 86 to help mitigate CTE variances amongst the material in the optical seeker assembly 30. Thus, the ceramic substrate 86 may act as a mount for which the optical detector 34 is connected on its opposing side opposite the second end 42 of the optical wedge 32. The ceramic substrate 86 may be metalized with pads to accept the solder bumps of the optical detector 34 and a trace line that wraps over the edge of the optical detector to provide solder pads at 90° to the detector mount. The ceramic substrate has solder pads on it with pins. The optical detector 34 may be connected with the pins through short wires, typically made from gold or aluminum. Wires may be used to connect the circuit card assembly 36 to the ceramic substrate instead of the flexible circuit 60.

Figure 7:
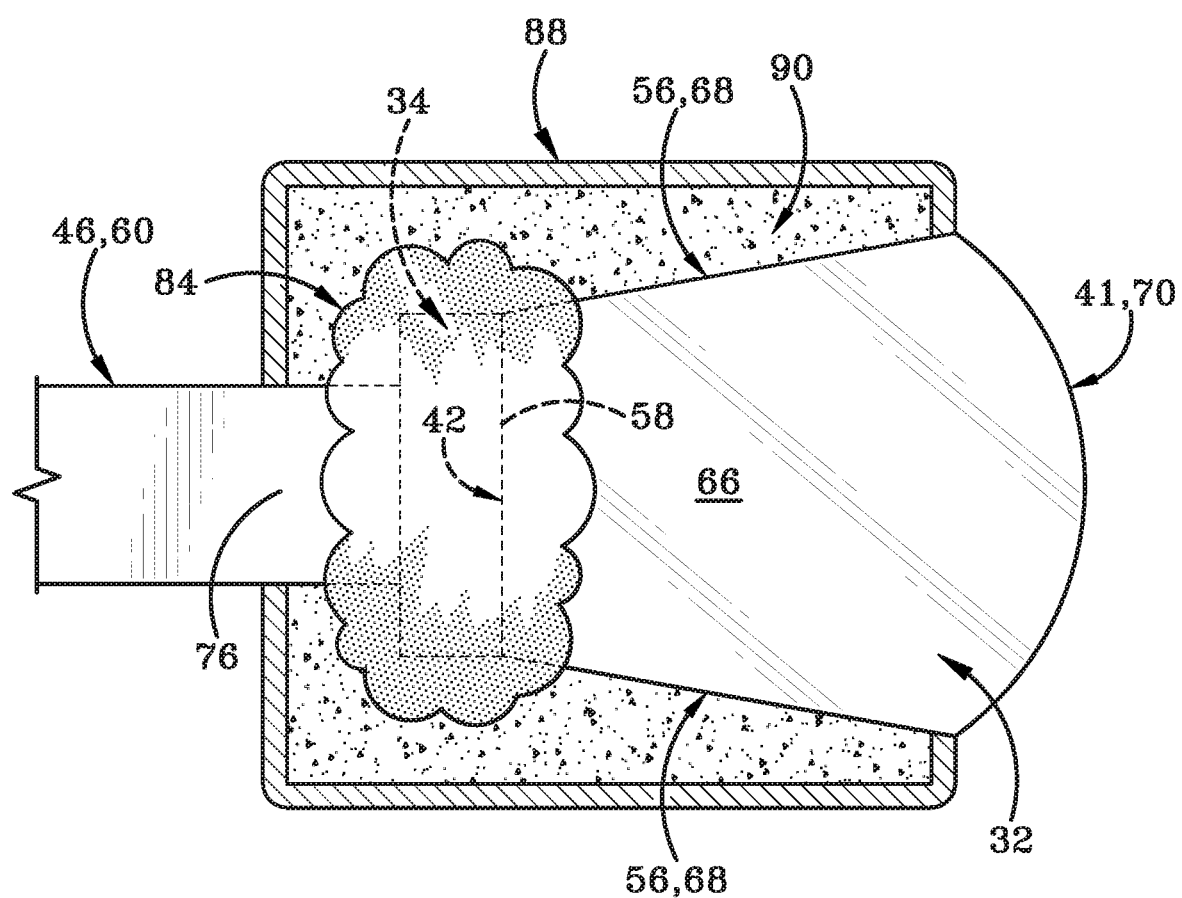
FIG. 7 is a diagrammatic top view of the optical seeker within a housing filled with a phase-change substance, such as wax, that surrounds the optical seeker.

FIG. 7 depicts a housing 88 that addresses an additional concern with the operation of the detector 34 within the wing 22 of the platform 10 traveling at supersonic speed. Namely, heat is generated at the leading edge 40 of the wing 22 and on the curved first surface 41 of the wedge. The optical material provides a conduction path for the heat directly to the detector 34, which has been bonded to the second end 42 of the optical wedge 32. In order to limit the conduction path, the optical seeker assembly 30 may be designed with a separate element (not shown), which would be mounted forwardly from the optical wave guide 32 with an air gap to provide thermal insulation. To further assist with the thermal management, the optical waveguide 32, the detector 34 and the flex circuit interface with the optical detector 34 may be encapsulated within the housing 88. Housing 88 may be filled with a phase change material such as paraffin wax; however, other materials could be used. The phase change material 90 maintains the temperature of the optical waveguide 32 and the detector 34 over the timeline of the flight by absorbing the thermal energy into the transition of the phase change material 90 from solid to liquid. The detector interface to the optical waveguide 32 and the flex circuit 60 can be potted via potting 84 in order to protect the interface from the phase change material 90 within the housing 88 and to provide a strong mechanical bond that the optical epoxy bonding the detector and wedge typically does not provide.

The foregoing addresses the need for mounting the optical detector 34 in the wing 22 in the rocket or supersonic missile. The supersonic speed of the missile or platform 10 causes the wings 22 to get very hot. It is well known that optical detectors do not perform optimally under high temperature conditions. Thus, according to one aspect of the present disclosure, the optical seeker assembly 30 is sitting within, or submerged within, or otherwise surrounded by wax (or any other phase change material) to insulate the optical detector. The wax or phase change material does not have the same index of refraction as air, thus the optical wedge, or optics, cannot rely on the total internal reflection off the sides of the wedge. Accordingly, the optical wedge has a reflective coating applied to the side surfaces 66 of the optical wedge. The wax, in addition to being an insulator, also maintains temperature by undergoing a phase change. The latent heat absorption due to the solid to liquid wax phase change keeps the detector at a near constant temperature while providing thermal protection for the onboard electronics.

Figure 8:
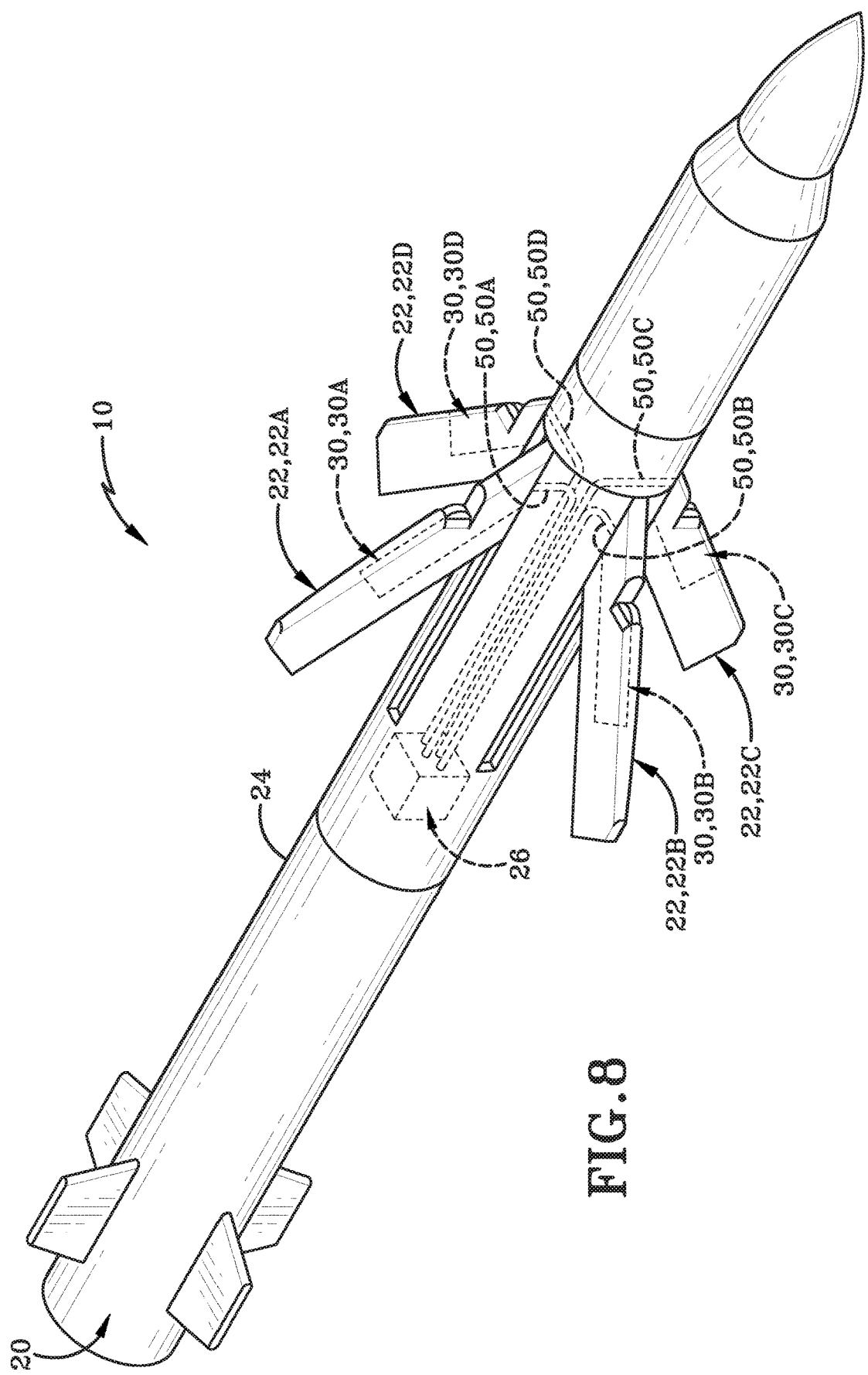
FIG. 8 is a perspective view of the precision guided munition with four wings or canards in the deployed position, and each wing or canard having a seeker and its optical detections components mounted within each respective wing.

FIG. 8 depicts a plurality of optical seeker assemblies 30 mounted on missile or platform 10. In one particular embodiment, there is at least one optical seeker assembly 30 within each respective canard or wing 22 of the platform 10. In one particular embodiment, a first optical seeker assembly 30A is carried by a first wing 22A, a second optical seeker assembly 30B is carried by a second wing 22B, a third optical seeker assembly 30C is carried by a third wing 22C, and a fourth optical seeker assembly 30D is carried by a fourth wing 22D. Each of the respective canards or wings, 22A-22D, are respectively pivotally coupled to the main body 24 of the platform 10 and each pivots between a retracted first position and a deployed second position. The wings 22A-22D deploy to their respective second positions after the platform or missile 10 has been fired from the aerial vehicle 12. As will be described in greater detail below, signals transmitted along respective low bandwidth links 50A-50D from the seekers 30A-30D, respectively, to the central or main CPU 26 for processing so that the missile 10 may be guided to its intended target 14 by controlling the thrust of the missile 10 and mechanical movements of the wings 22A-22D.

Having thus described the structure and configuration of the optical seeker assembly 30, reference will now be made to its operation and its operational advantages.

When the projectile such as a rocket or missile (i.e., platform 10) in launched from a platform 12, such as a helicopter, the projectile has a sufficient amount of thrust to propel the projectile to supersonic speeds (i.e., faster than the speed of sound; above Mach 1). While the speed at which the projectile travels is only at supersonic speed for a relatively short amount of time until the projectile impacts its intended target 14, it is a sufficient amount of time to confound or impede the electrical circuitry and the detector performance. Thus, phase change material 90, such as wax, can surround or embody the optical seeker assembly 30 to insulate it from the rapidly changing external environment.

As the projectile (i.e., munition 10) is deployed or launch from platform 12, its canards or wings 22 move from the collapsed first position to the deployed second position. This is accomplished via pivot 52. As the canards or wings 22 pivot towards the deployed position, a sufficient amount of space is available for low bandwidth link 50 (i.e., a small wire harness) to extend from the wing 22 to the body 24 without significantly interfering with the mechanical pivoting movement which has heretofore increase complexity and thus cost in missile design. This is an improvement over conventional technology which required a high bandwidth link, such as a bundle of fiber optic cables, to traverse or span the region between the wing 22 and the body 24 after the wing had been deployed.

The optical seeker assembly 30 on the projectile 10 is used in conjunction with a laser system 18, which may be a semi-active laser carried by the second platform 12. When the laser on the second platform 12 is a semi-active laser, it acts as a designator, which points a laser beam or a pulsed laser beam towards the target 14. The optical seeker assembly 30 is designed to receive the laser reflections and observe or detect the laser spot on the target 14 and determine the angle of the spot relative to the body of the projectile in order to guide the projectile to the spot. Thus, the projectile may be considered a high-precision projectile. The return signal from this spot is at a very particular return frequency. The return frequency is sensed against an uncontrolled background. The laser may be pulsed or flashed, which allows the assembly 30 to A/C couple the background in order to discriminate against the flashing laser spot. The laser has a specific pulse repetition frequency to enable the projectile to discriminate between multiple spots in the event there are multiple laser beams being transmitted simultaneously.

The optical detector 34 which detects the laser beam return signal from target 14 may be front-side illuminated or backside illuminated depending on a preferred assembly application. If the user desires to configure the optical seeker assembly with a front-side illumination of the optical detector, then the leads that bring the optical signal out of the optical detector are on the same side of the detector as where the illumination is entering. If the connections are on the other side of the detector from where the illumination is entering, then bump bonding can be used to bond the optical detector to a substrate to eliminate the losses that may be incurred in a front-side illumination configuration. There are some disadvantages to backside illuminations relating to losses that occur in the optical input data. Thus, while the present disclosure envisions front-side illumination and backside illumination as being possible of the optical detector, the user may vary the illumination configuration depending on their application's specific needs.

The circuit card assembly 36 carrying the processing elements connected with the optical detector is mounted on a plane or other aircraft that, according to one example, may be parallel to the longitudinal optical access of the optical wedge. The detector 34 may be oriented such that the entrance opening is facing outwardly from the front edge of the wing. The entrance aperture in one example is approximately a 2×10 millimeter aperture such that the length dimension is oriented along the longitudinal axis of the wing. The electronic circuitry is mounted in the wing and it is oriented such that its major surfaces are offset parallel to the optical axis of the optical wedge.

Regarding the circuit card assembly 36, which performs the following processing within the wing 22, the detector 34 produces a current that is proportional to the intensity that has been sensed by the seeker 32 over time. The transimpedance amplifier 92 converts the current from the detector into a voltage. Inasmuch as a very short pulse, typically around 20 nanoseconds, the pulse is extremely sensitive to capacitance both at the optical detector output and at the transimpedance amplifier. The transimpedance amplifier 92 helps to preserve bandwidth of the signal. The transimpedance amplifier 92 is electrically close to the detector to amplify signals, especially low level signals, before the signals are processed by other components of the electronic circuitry. This enables the signal to be amplified or boosted as early as possible to overcome any downstream noise influences. After the voltage is output from the transimpedance amplifier 92, a signal is sent through the high-pass filter 94 to the variable gain amplifier 96. The variable gain amplifier 96 amplifies the voltage and it varies the gain because over the mission of the projectile, the projectile is at a long range to the target and as it closes in on range of the target, the intensity of the signal increases because the projectile is getting closer to the target. Thus, there is less transmission loss to the atmosphere. Accordingly, the amplitude goes through a large dynamic range throughout the engagement or movement of the projectile.

Within wing 22, the variable gain amplifier 96 allows the signal to maintain a signal return within the range of the digitizer or the ADC converter 98 that follows. A high pass filter enables the short pulse to be identified by filtering out the high background information. The A/C coupling provided by the high pass filter ensures that the full dynamic range available is applied to the pulse such that background information is not digitized. Within wing 22, the ADC converter 98 samples the pulse. In one particular embodiment, the ADC converter 98 may sample the pulse signal at a sample rate in a range from 60 mega samples per second to about 100 mega samples per second. The sampled data output from the ADC converter 98 is transmitted to the pulse discrimination processor 38 which may be a field programmable gate array (FPGA). Within wing 22, the processor 38 performs the pulse detection processing to reduce the bandwidth of the signal from 100 mega samples per second down to less than 50 Hz to thereby generate detection data. In some implementation the detection data may be less than about 20 Hz. Then, the sampled detection data generator by the pulse discriminator 38 or processor is considered to be a low bandwidth data that may be transmitted along a small trace line or electrical wire harness (i.e., low bandwidth link 50) that is fed outwardly from the wing 22 across or around the mechanical pivot connection 52 of the wing to the fuselage body and into the fuselage body to be processed by this main central computer or CPU. The central processor within the main body of the projectile receives and combines the low bandwidth data with output from each FPGA on each respective wing connected to the projectile. The CPU is then programmed to guide the projectile to the target based on the data.

The low bandwidth cable or link 50 extends from the wing 22 back to the main fuselage or body 24 of the precision guided munition 10. Previously, number of fiber optic cables in a fiber optic bundle required to bring high bandwidth data from the optical wedge 32 would be difficult for the 8 pixels of a conventional optical wedge. As the number of pixels increases or is desired to increase, the number of fiber optic cables in the fiber optic bundle increases to account for the increased number of pixels, there is typically a separate cable for each pixel.

Thus, in one embodiment the present disclosure provides an optical seeker assembly 30 with the processor located within the wing 22 to reduce the detection signal down to a pulse data output rather than raw pulse measurement output. Pulse data output is a low bandwidth signal that can be transmitted along a wire harness 50 that may easily maneuver around the pivot 52 mechanical connection between the wing 22 and the fuselage or body 24 whereas the fiber bundles carrying the raw pulse data are required for high bandwidth transmissions that physically interfere or may impinge the mechanical pivoting movement of the wing relative to the fuselage body. Pulse output, or pulse repetition rate of the system of one example of the present disclosure is about 20 Hz, and is thus very minimal data compared to the high bandwidth information that would travel typically along a fiber optic cable.

Figure 9:
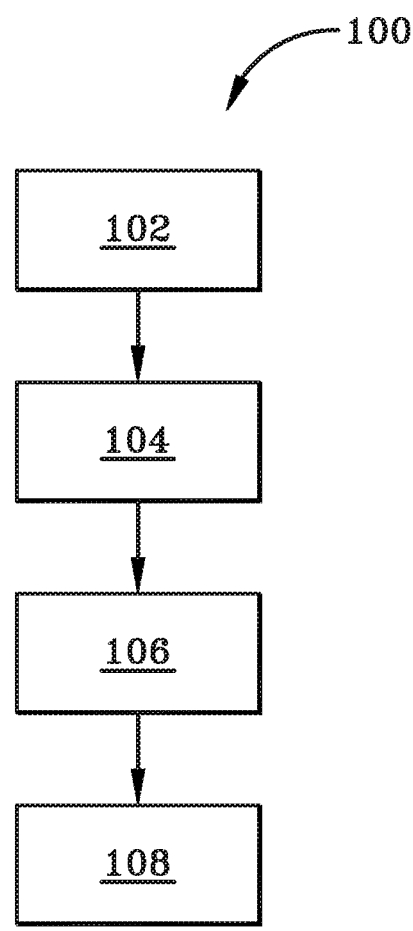
FIG. 9 is a flow chart depicted a method in accordance with one aspect of the present disclosure.

FIG. 9 depicts a method in accordance with one aspect of the present disclosure generally at 100. Method 100 includes deploying a wing connected to a body from a first position to a deployed second position and detecting a signal with an optical seeker assembly carried by the wing, which is shown generally at 102. Method 100 includes processing the signal within the wing to generate a low bandwidth data stream, which is shown generally at 104. Method 100 includes transmitting the low bandwidth data stream along a low bandwidth link from the wing in the deployed second position to the body, which is shown generally at 106. Method 100 includes guiding the body towards a target based on data contained in the low bandwidth data stream, which is shown generally at 108.

Method 100 may further provide that deploying the wing (i.e., step 102) could be accomplished by deploying the wing 22 from a pivot connection 52 and ensuring that low bandwidth link 50 has a minimal cross sectional area so as to not interfere with the mechanical deployment in a manner that occurs when fiber optic bundles are utilized to transfer raw data from the optical wedge 32 and an optical detector 34 positioned within the main body 24 of the missile 10. Thus, method 100 is an improved method of operation based on the optical detector 34 being located within the wing 22. The manner in which the wing is deployed in step 102 may be accomplished in any number of ways, wherein the pivoting deployment is just but one possible deployment method. For example, the wings 22 may deploy linearly outward away from a longitudinal center axis of the body 24.

The step 104 of processing the signal has been addressed herein but again references the processing of the return laser signal or pulse data that has returned from the target 14. The processing of the return laser signal is accomplished via the circuit card assembly 36 and its components, such as the transimpedance amplifier 92, the high pass filter 94, the variable gain amplifier 96, and the ADC converter 98 that are all located within the wing 22 and not within the body 24. Collectively, the low bandwidth data stream generated by the optical converter 38, which is also located within the wing, based on the processed signal data from the circuit card assembly 36, is of a sufficiently low frequency and bandwidth (typically around 20 MHz) that is may be transmitted along the low bandwidth link 50 (i.e., step 106) for central processing within the CPU within the body 24.

Step 108 may be effectuated by the CPU by combining the low bandwidth data stream from a first optical seeker assembly 30A with the respective other low bandwidth data stream from additional optical seeker assemblies 30B-30D located on other wings 22 of the platform. The CPU then computes and the best route to maintain trajectory 16 of platform 10 to ensure that it reaches target 14. The precisions guided munition 10 will detonate at or near the target to precisely destroy the same.

Another portion of method 100 may account for the fluctuations and variances in temperature experienced by the optical seeker assembly 30 and its components located within wing 22 based on the supersonic speed at which the projectile moves. Thus, aspects of method 100 may account for controlling the CTE of some components of the optical seeker assembly. For example, method 100 may include depositing the optical detector 34 and the optical wedge 32 inside of phase change material 90. Then, during movement of the projectile along trajectory 16, the heat may be sufficiently high to transition the phase change material from a first phase state to a different second phase state. For example, the phase change material may be was that is a solid first phase state when the wing is in the collapsed first position but transitions to a liquid second phase state when the body is moving along trajectory 16 and the wing is in the deployed second position.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An optical seeker assembly for a precision guided munition, the optical seeker assembly comprising:
   an optical waveguide configured to transmit an optical signal therethrough; and
   an optical detector coupled to the optical waveguide to detect the optical signal transmitted through the optical waveguide,
   wherein the optical waveguide and the optical detector move in unison being carried by a wing of the precision guided munition as the wing moves from a first position to a deployed second position.

2. The optical seeker assembly of claim 1, further comprising:
   a first end of the optical waveguide that is sized complementary to an aperture formed in a leading edge of the wing; and
   a second end of the optical waveguide disposed forwardly from a trailing edge of the wing, wherein the optical detector is connected to the second end of the optical waveguide and the optical detector is positioned forwardly from the trailing edge within the wing.

3. The optical seeker assembly of claim 2, further comprising:
   a circuit card in electrical communication with the optical detector for processing a plurality of pulses detected by the optical detector, wherein the circuit card has a rear edge disposed forwardly from the trailing edge within the wing.

4. The optical seeker assembly of claim 3, further comprising:
   a low bandwidth link between the wing and a body of platform to which the wing is moveably connected; and
   a pulse discriminator mounted within the wing electrically coupled to the circuit card for converting the pulses into low bandwidth signals for transmission along the low bandwidth link from the wing to a main processor within the body of the platform.

5. The optical seeker assembly of claim 1, wherein the optical seeker assembly is free of any fiber optic cables that extend from the wing into a main body to which the wing is moveably connected.

6. The optical seeker assembly of claim 3, further comprising a pulse discriminator, wherein the pulse discriminator is a field programmable gate array (FPGA) within the wing that down samples processed pulse data from the circuit card into the low bandwidth signal for transmission along the low bandwidth link in the form of a wire harness that does not inhibit the movement of the wing between the first and second positions.

7. The optical seeker assembly of claim 3, wherein the circuit card comprises:
- a transimpedance amplifier
- a high pass filter electrically downstream from the transimpedance amplifier;
- a variable gain amplifier electrically downstream from the high pass filter; and
- an analog-to-digital converter electrically downstream from the variable gain amplifier.

8. The optical seeker assembly of claim 7, further comprising:
- a flexible circuit coupling an output of the optical detector to an input of the transimpedance amplifier, wherein the flexible circuit is disposed entirely within the wing.

9. The optical seeker assembly of claim 1, further comprising:
- a longitudinal axis of the optical waveguide; and
- a circuit card mounted within the wing in electrical communication with the optical detector, wherein the circuit card has a first major surface that does not intersect the longitudinal axis of the optical waveguide within the wing.

10. The optical seeker assembly of claim 1, further comprising:
- a lens that focuses light in one dimension;
- a narrow passband optical filter matching designator wavelength; and
- an optical epoxy that mounts the optical detector directly to the optical waveguide.

11. The optical seeker assembly of claim 1, further comprising:
- a phase change material within a housing exterior to the optical waveguide adapted to ensure that the optical detector temperature is maintained within an operational range during a transitory event that affects thermal environment; and
- a reflective coating on the optical waveguide.

* * * * *